United States Patent [19]
Benn et al.

[11] Patent Number: 6,036,078
[45] Date of Patent: Mar. 14, 2000

[54] REPAIRING A WEAK SPOT IN THE WALL OF A VESSEL

[75] Inventors: Ernest Stanley Benn; Simon Kam-Sang Yuen, both of Calgary, Canada

[73] Assignee: Shell Oil Company, Houston, Tex.

[21] Appl. No.: 09/129,282

[22] Filed: Aug. 5, 1998

[30] Foreign Application Priority Data

Aug. 15, 1997 [CA] Canada .................................. 2213169

[51] Int. Cl.$^7$ ................................................. B23K 31/02
[52] U.S. Cl. .......................... 228/119; 228/138; 228/184; 228/212
[58] Field of Search .................................. 228/119, 138, 228/139, 184, 189, 212, 213, 232

[56] References Cited

U.S. PATENT DOCUMENTS

| | | | |
|---|---|---|---|
| 4,065,846 | 1/1978 | Leonard, Jr. | 228/119 |
| 4,709,729 | 12/1987 | Harrison | 138/99 |
| 5,143,275 | 9/1992 | Hara et al. | 228/119 |

*Primary Examiner*—Samuel M. Heinrich

[57] ABSTRACT

A method of repairing a weak spot in the wall of a vessel, which method comprises (a) securing at least one support element to the wall of the vessel in the neighborhood of the weak spot, wherein the ends of the support element(s) are fixed to the wall of the vessel; (b) covering the surface of the wall around the weak spot by means of a weld overlay in overlay area; (c) causing a support element to elongate by an amount which balances the thermal expansion caused by the welding; and (d) removing the support element after the welding has been substantially completed.

6 Claims, 1 Drawing Sheet

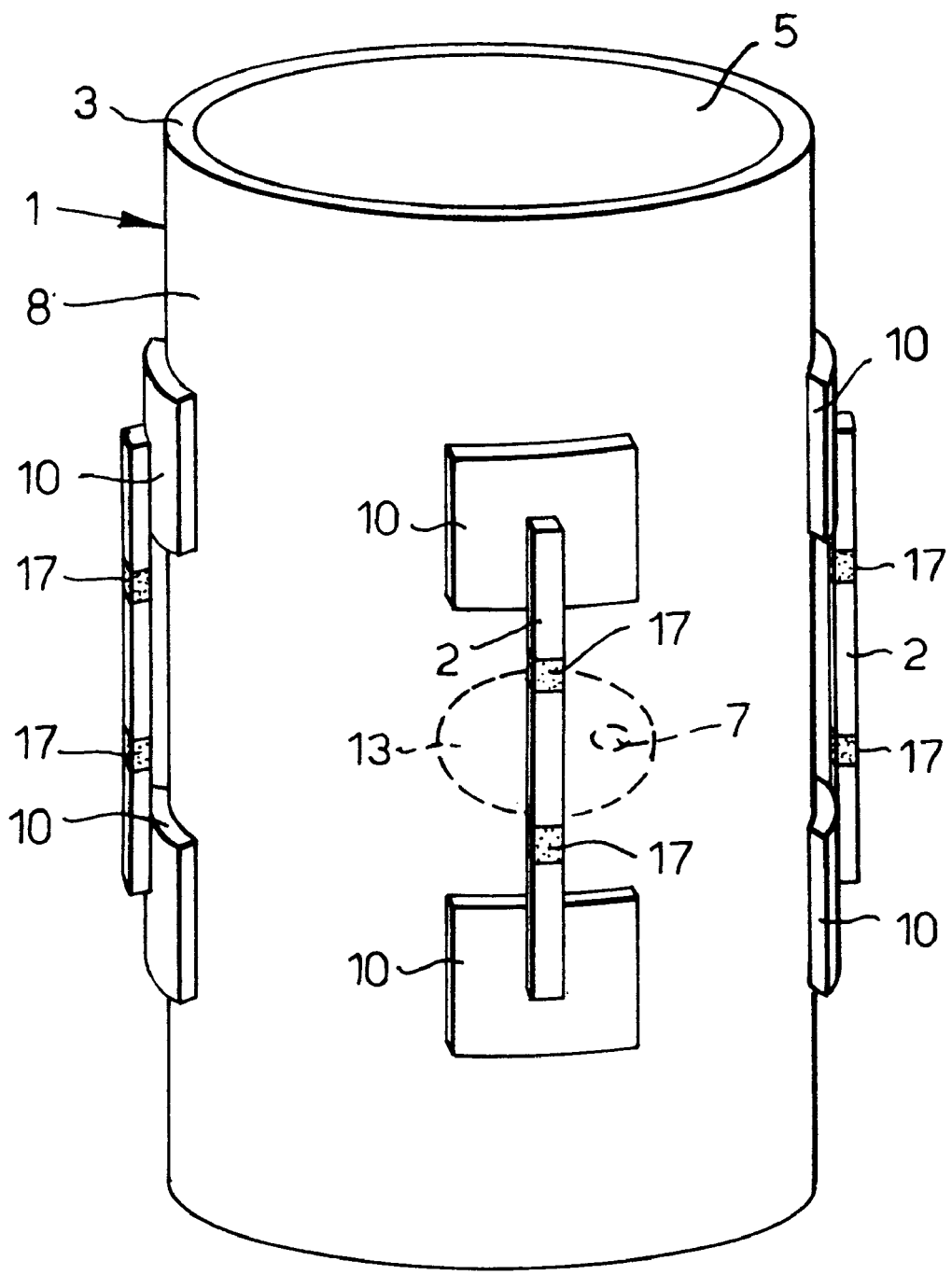

REPAIRING A WEAK SPOT IN THE WALL OF A VESSEL

FIELD OF THE INVENTION

The present invention relates to a method of repairing a weak spot in the wall of a vessel, such as a distillation column. In particular the present invention relates to repairing the weak spot while the vessel is in place.

BACKGROUND OF THE INVENTION

A weak spot in a vessel is typically repaired by means of a welded repair, such as an overlay of welding material. The welding material is laid down over the weak spot in several layers until the wall has a sufficient thickness and strength. Laying down the welding material can be done manually, or by using an automatic welding machine which is mounted in the neighbourhood of the weak spot. Alternatively, the welded repair is effected by removing portions of the vessel wall in the vicinity of the weak spot and inserting metal panels. In some cases, metal panels may be fixed to the vessel wall over the weak spot.

When making a welded repair, the heat of the welding is transferred to the wall of the vessel, and thus local hot spots are formed in the wall. This causes local deformation of the wall, which can cause distortion of the vessel.

To minimize such distortion, the vessel can be supported with a crane, however, for a very tall vessel, such as a distillation tower, this would require an expensive tall crane. It may also be impractical or unsafe to use a crane because of the location of the vessel in a plant.

Support elements may be arranged over the weak spots, wherein the ends of of the support elements are fixed to the wall of the vessel. Such support elements are sometimes called "strong-backs." The support elements locally strengthen the wall of the vessel and support the vessel during the repair. The number of support elements is determined by the amount of support that is required.

An advantage of such support elements is that they are easily applied. However, a disadvantage is that they also restrict thermal extension of the vessel wall at the place where the welded repair is made which causes high thermal stresses in that part of the wall where the welded repair is made.

SUMMARY OF THE INVENTION

It is an object of the present invention to overcome the problem of weld repair without restricting thermal extension of the vessel wall.

To this end the method of repairing a weak spot in the wall of a vessel according to the present invention comprises (a) securing at least one support element to the wall of the vessel in the neighborhood of the weak spot, wherein the ends of the support element(s) are fixed to the wall of the vessel; (b) making the welded repair to the weak spot; (c) causing a support element to elongate by an amount which balances the thermal expansion caused by the welding; and (d) removing the support element after the welding has been substantially completed.

BRIEF DESCRIPTION OF THE DRAWINGS

FIG. 1 shows a perspective view of part of a vessel provided with support elements.

DETAILED DESCRIPTION

The invention will now be described in more detail by way of example with reference to FIG. 1.

The vessel 1 has a wall 3, and on the inner surface 5 of the wall 3 there is a weak spot 7 which needs to be repaired.

In accordance with the present invention four support elements 2 are secured to the wall 3 of the vessel 1 in the neighbourhood of the weak spot 7. For the sake of clarity, the support element at the back side is not shown in the Figure. The ends of each support element 2 are fixed to the outer surface 8 of the wall 3 by means of temporary reinforcement pads 10 secured to the wall 3.

With the support elements 2 in place, a welded repair is made on the inner surface of the wall 2 around the weak spot 7 in the form of a weld overlay which is applied in the overlay area 13 which covers the weak spot 7.

The support elements 2 restrict expansion of the wall 3. To reduce thermal stresses, the support elements are elongated by an amount which balances the thermal expansion caused by applying the weld overlay. In order to do so, the support elements 2 are heated which causes them to elongate. In the embodiment shown in FIG. 1, heating pads 17 are provided which heat the support elements 2 electrically. The elongation which balances the thermal expansion is normally equal to the thermal expansion caused by making the welded repair, however, in some instances the thermal expansion may be selected as slightly larger to put the part of the vessel wall in the vicinity of the weak spot in tension.

When the weld repair in the form of the weld overlay is at least substantially complete, the support elements 2 are removed.

By balancing the elongation the support elements, the thermal stress build-up in the wall of the vessel is reduced in a very simple way.

The number of support elements is suitably between four and eight, and they are evenly spaced along the circumference of the vessel in axial direction. They can be applied on the outer surface or on the inner surface of the wall.

Suitably all support elements are caused to elongate when the weld overlay is being applied, however, for a small overlay area it will only be required to cause the support element adjacent the overlay area to elongate.

Causing a support element to elongate can be done by heating the support element. Alternatively this can be done mechanically, and to this end the support element is provided with a hydraulic or mechanical jack, which is activated to elongate the support element.

The invention has been described with reference to a welded repair in the form of a weld overlay of welding material. The welding material can be welding rod material for manual welding or welding material from a continuous roll when a welding machine is used. Alternatively, the welded repair can be made to the weak spot by removing part of the vessel wall in the vicinity of the weak spot to make an opening in the wall and by inserting a metal panel or metal panels in the opening. In some cases, a metal panel or metal panels may be fixed to the vessel wall over the weak spot to cover it.

The invention may also be applied to a vessel which is not in place or which is not vertical.

The support elements and the vessel wall can be provided with instruments to determine the stresses in the support elements and the wall of the vessel. The results of the measurements can be used to determine the required elongation of a support element to balance the thermal expansion caused by the welding.

We claim:

1. A method of repairing a weak spot in a wall of a vessel, which method comprises (a) securing at least one support element having ends to a wall of a vessel in the neighborhood of a weak spot in said wall, wherein the ends of said support element(s) are fixed to the wall of said vessel; (b) making a welded repair to said weak spot; (c) causing a support element to elongate by an amount which balances any thermal expansion caused by the welding; and (d) removing the support element after the welding has been substantially completed.

2. Method of claim 1, wherein the support element is heated to cause it to elongate.

3. Method of claim 1, wherein the support element is provided with a jack which is activated to cause the support element to elongate.

4. Method of claim 1, wherein making the welded repair comprises covering the surface of the wall around the weak spot by means of a weld overlay.

5. Method of claim 1, wherein making the welded repair comprises removing part of the wall surrounding the weak spot and applying a metal panel in the opening.

6. Method of claim 1, wherein making the welded repair comprises applying a metal panel over the weak spot.

* * * * *